United States Patent [19]
Peterson

[11] 3,950,684
[45] Apr. 13, 1976

[54] DIRECT CURRENT MOTOR SPEED CONTROL APPARATUS

[75] Inventor: Robert S. Peterson, Williamsville, N.Y.

[73] Assignee: Westinghouse Electric Corporation, Pittsburgh, Pa.

[22] Filed: May 29, 1974

[21] Appl. No.: 474,285

[52] U.S. Cl. ................ 318/338; 318/405; 318/406
[51] Int. Cl.² ........................................... H02P 5/16
[58] Field of Search ................... 318/338, 405, 406

[56] References Cited
UNITED STATES PATENTS

| | | |
|---|---|---|
| 2,964,691 | 12/1960 | Dinger ............................... 318/338 |
| 3,047,729 | 7/1962 | Peterson et al. ................ 318/338 X |
| 3,054,937 | 9/1962 | Long ............................... 318/338 X |
| 3,197,688 | 7/1965 | Horner, Jr. ........................ 318/338 |
| 3,599,064 | 8/1971 | Friedman ........................... 318/338 |
| 3,811,079 | 5/1974 | Tashiro et al. ..................... 318/338 |

*Primary Examiner*—B. Dobeck
*Attorney, Agent, or Firm*—R. G. Brodahl

[57] ABSTRACT

A direct current motor speed control apparatus is disclosed for controlling the motor speed from zero to base speed primarily by an armature voltage control and for controlling the motor speed from base speed to a rated run speed primarily by field flux control.

15 Claims, 8 Drawing Figures

DIRECT CURRENT MOTOR SPEED CONTROL APPARATUS

BACKGROUND OF THE INVENTION

In relation to providing desired speed control for a large direct current drive motor, such as the drive motor for a reversing slab mill, it is sometimes desired to accelerate the drive motor from zero speed to rated run speed in a time period of about 3 seconds. The applied speed reference signal to the motor speed control apparatus is increased accordingly, and it is compared with an actual speed feedback signal to establish a speed error condition signal which is amplified and applied to the voltage supply operative with the drive motor armature. This modifies the motor armature voltage as necessary to correct any speed error condition.

In the operation of the prior art speed control apparatus, the typical speed reference signal rapidly comes up a ramp and the motor speed goes up accordingly. At the dynamic crossover at base speed, the field flux begins to weaken but not fast enough to avoid motor armature voltage overshoot. If for purpose of illustration, it is assumed that the typical drive motor, of about 10,000 to 15,000 horsepower rating to be controlled in its speed of operation, is designed to be operated for about 20 years of normal life, and if undesired over terminal voltage operation is permitted in relation to rapid speed changes, this could result in motor deterioration such that only 10 years or so of satisfactory operational life might be obtained and additional maintenance and upkeep cost could be realized.

A prior art speed regulated electrical drive is shown in a published article which appeared in the Iron and Steel Engineer yearbook for 1966 at pages 659 to 667. The motor control system consisted of two regulators including a speed regulator operating on the armature power supply and a counter EMF regulator operating on the motor field. The counter EMF regulator consisted of a motor field flux regulator and a counter EMF preamp. At values below rated counter EMF of the direct current motor, the regulator is biased to hold the motor at full field flux. Above base speed of the motor the counter EMF of the drive is clamped at its rated value and the motor field excitation is decreased to hold this value as the motor speed is increased. This results in the motor being operated at maximum field and therefore maximum available torque and power for any operating speed. The speed controller consists of two loops, an inner loop armature current controller and an outer speed control loop, with the armature current limit obtained by limiting the speed controller output which represents a reference of the armature current controller. The speed controller has a proportional plus integral response characteristic, and provides together with the integral relationship between speed and current a double integrating speed control loop, which responds to changes of the speed reference signal as a zero velocity error system.

In U.S. Pat. No. 3,497,779 of H. Eisele, assigned to the same assignee, there is disclosed a parallel controller arrangement, including a voltage controller and a current controller, operative to control the armature voltage of a direct current motor. The voltage controller responds to a desired speed reference signal for controlling the motor armature current. When the armature current exceeds a predetermined current limit value, the current controller assumes control over the voltage controller and effectively provides a maximum value of controlled armature current.

SUMMARY OF THE INVENTION

Direct current drive motor speed control apparatus is provided for controlling the operating motor speed below base speed by armature voltage control and for controlling the operating motor speed above the base speed by field flux weakening control. The field weakening control begins to function in response to a sensed and predetermined reduced magnitude of armature voltage below rated armature voltage, such as 75% thereof, to allow a transient adjustment of field exciter voltage and thus the armature voltage of the motor without presenting an overvoltage condition to the motor armature. This permits regulating the armature voltage instead of the counter EMF, to permit the motor to be operated at the maximum capability without armature terminal voltage overshoot above rated terminal voltage.

DESCRIPTION OF A PREFERRED EMBODIMENT

Figure 1:
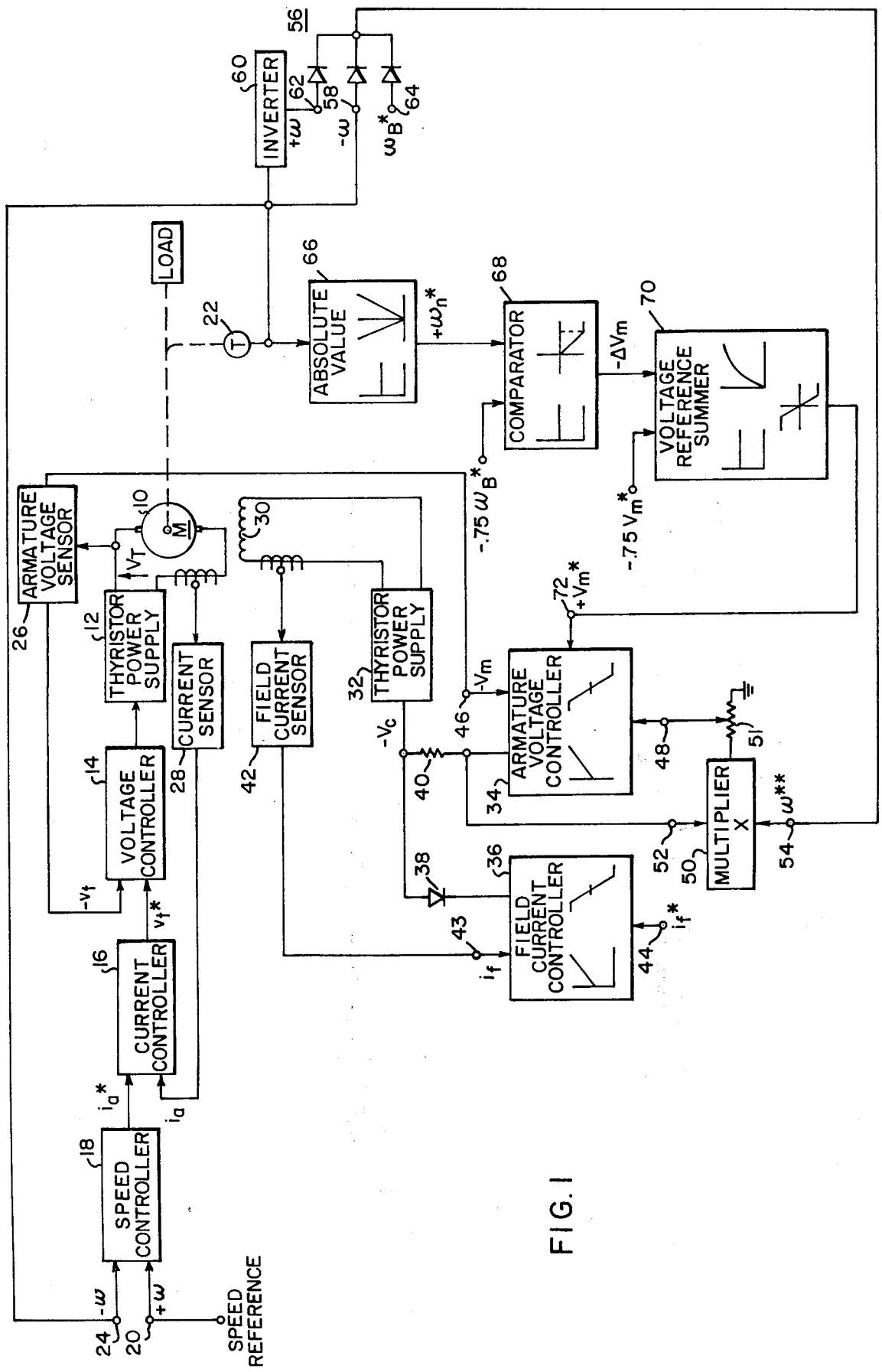
FIG. 1 shows a schematic diagram of the direct current motor speed control apparatus of the present invention.
Figure 2:
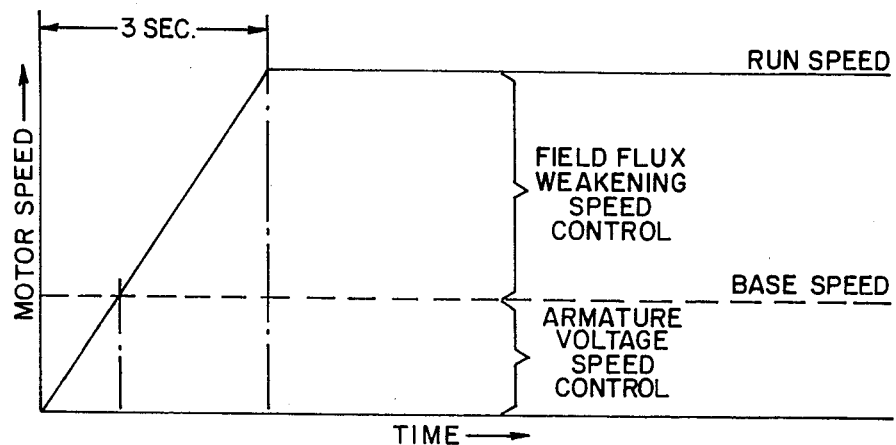
FIG. 2 is a curve illustrating the well known speed control of a direct current motor by a combination of armature voltage control below base speed and field current weakening control above base speed up to rated run speed.

In FIG. 1 there is shown a schematic diagram of the direct current motor speed control apparatus of the present invention, including a direct current motor 10 having its armature terminal voltage provided by a thyristor power supply 12 in accordance with a reference voltage signal Vt* operative with a voltage controller 14, and with the armature current of the motor 10 limited by a current controller 16 and with the operating speed of the motor 10 being determined by a speed controller 18. A desired speed reference +W*, with the positive polarity being indicative of the forward direction of motor operation, is applied through terminal 20 of the speed controller 18. An actual speed feedback signal —W from a speed sensor 22 is applied to terminal 24 of the speed controller 18, such that any difference between the speed reference signal +W* and the actual feedback speed signal —W is operative to regulate the operating speed of the motor 10. An armature voltage sensor 26 is operative to provide an actual voltage feedback signal —Vt to the volt-controller 14, and a current sensor 28 is operative to provide an armature current feedback signal $i_a$ to the current controller 16.

The field winding 30 of the motor 10 is energized by a field voltage providing thyristor power supply 32 in accordance with a field voltage control signal −Vc determined by an armature voltage controller 34 of a field current controller 36. A diode switching circuit including a diode 38 and a resistor 40 is operative to determine which of the voltage controller or current controller 35 is operative to determine the field voltage of winding 30 through operation of the thyristor power supply 32. A field current sensor 42 is operative with the field current controller 36 for providing a feedback field current signal $i_f$. A desired field current reference signal $+i_f$ is applied to terminal 44 of the field current controller 36. The voltage controller 34 has applied to its terminal 46 from the armature voltage sensor 26 an armature voltage feedback signal −Vm. The terminal 48 operates with the operational amplifier feedback circuit of the voltage controller 34 for determining gain and receives a speed related control signal from a signal multiplier circuit 50 in accordance with the product of the voltage controller 34 output signal −Vc applied to terminal 52 and a motor speed related feedback signal absolute W** applied to terminal 54 from a biased diode circuit 56. The speed sensor 22 provides a motor speed feedback signal −W to terminal 58 of the diode circuit 56 and an inverter 60 applies an inverted motor speed back signal +W to the terminal 62. The terminal 64 receives a master base speed reference signal Wb*. The diode bias circuit 56 is operative such that the output signal absolute W** applied to the terminal 54 of the signal multiplier 50 is equal to the master base speed reference +Wb* when the motor speed is less than or equal to the motor base speed and the signal absolute W** applied to the terminal 54 is equal to the actual motor speed W when the motor speed is greater than the motor base speed. The actual motor feedback speed signals applied to the respective terminals 62 and 58 are provided such that speed control is applied for both a first and second direction of operation of the motor 10.

In addition, the actual motor speed feedback signal −W is applied through an absolute value circuit 66 to a comparator 68 for comparison with a bias voltage −0.75 Wb determined as a predetermined percentage of the desired base speed, for example 75 percent of the base speed reference signal as indicated in FIG. 1. The voltage reference summer circuit 70 is operative to sum the output signal −ΔVm* from the comparator 68 with a predetermined percentage of an armature voltage reference signal −0.75 Vm, for example 75 percent of the armature voltage reference signal Vm, to determine the control signal +Vm* applied to terminal 72 of the voltage controller 34. The thyristor power supply 32 is controlled by a gating signal $V_c$, which is generated by one of the two operational amplifier controllers connected in parallel. The output of this parallel combination of controllers, the gating signal $V_c$, is equal to the output of the operational amplifier with the lower output voltage. One operational amplifier controller is the voltage controller 34 provided for controlling the motor terminal or armature voltage, and the other operational amplifier controller is the current controller 36 provided for controlling the motor field current. If the voltage controller 34 tries to call for a field current greater than what the reference signal $ti_f$* from the field current controller 36 is set for, which is usually rated motor field current, the voltage controller 34 is switched out by the diode switching circuit including the diode 38 and the resistor 40; this would be the case when the motor 10 is operating at low terminal voltage and below, the base speed of operation. When the voltage controller 34 is calling for a field current less than the reference signal +$i_f$* setting from current controller 36, the current controller 36 is switched out by the resistor diode switching circuit and the voltage controller 34 now controls the field exciter voltage from the thyristor power supply 32 to thereby regulate the field flux of field 30 and indirectly the motor terminal voltage at the value determined by the reference signal from the voltage controller 34, and the latter would be the situation when the motor is operating at weakened field above its base speed of operation.

The voltage controller 34 has provision for changing of the controller gain as a function of motor speed through operation of the multiplier circuit 50. The gain in the motor itself included in the voltage feedback loop increases with motor speed in accordance with the relationship that the motor counter EMF equals motor speed times motor field flux. In order to maintain the same armature voltage loop gain regardless of motor operating speed, the voltage controller 34 gain should decrease as motor speed increases. Otherwise, the gain of the voltage loop would have to be adjusted to be stable at top speed when the gain would be maximum and slow at base speed when the gain is reduced by the field weakening ratio. At base speed, a fast voltage loop is required to prevent motor armature overvoltage when the motor is accelerating through base speed. The static multiplier 50 used to accomplish this adaptive gain feature as a function of motor speed is connected between the voltage controller 34 and the gain pot 51. The input signal applied to terminal 54 varies as a function of motor speed, and has a minimum constant value at motor speeds below rated run speed and a maximum voltage at maximum motor speed thus permitting a reduction in the gain of the voltage controller 34 to compensate for gain increase in the motor 10, connected in the control loop. The transfer function of the voltage controller 34 is as follows: Voltage Controller $T_1F_1 = KZ(1 + T5S)/TZS \cdot 1/Z$ where $Z = 1$ at motor speed below rated base speed, $Z$ = per unit motor speed at motor speed greater than rated base speed, KZ is a normalizing constant, $T5$ is equal to the lead time constant which compensates for the motor field time delay in seconds, $TZ$ is the controller integrating time constant in seconds and $S$ is the Laplace operator in one divided by seconds.

The motor armature current loop should be made as fast as reasonable without affecting the stability of the motor speed regulator system including the current controller 16 and speed controller 18. The faster the operation of the armature current loop including the current controller 16, the faster the operation of the voltage controller 34 and its associated control loop can be made. Interaction between the voltage controller 34 operating on the field flux of the motor field 30 and the armature current control loop including the current controller 16 limits the response of the voltage controller 34 to approximately one-tenth the time response of the armature current loop.

The voltage controller 34 has the ability to regulate for rated motor terminal voltage when drive motor 10 operates in its field weakening range and accelerates or decelerates on a fast ramp in terms of rated speed per second.

To determine the operation of the voltage controller 34, the signal +Vm* is programmed as a function of motor speed. This feature permits the voltage controller 34 to start regulating the field flux and thereby armature voltage before the motor gets to base speed. Using this feature, the transient armature voltage overshoot has occurred at a motor terminal voltage less than rated terminal voltage, and any voltage overshoot peak is less than the motor rated armature voltage as shown in FIG. 4.

Figure 3:
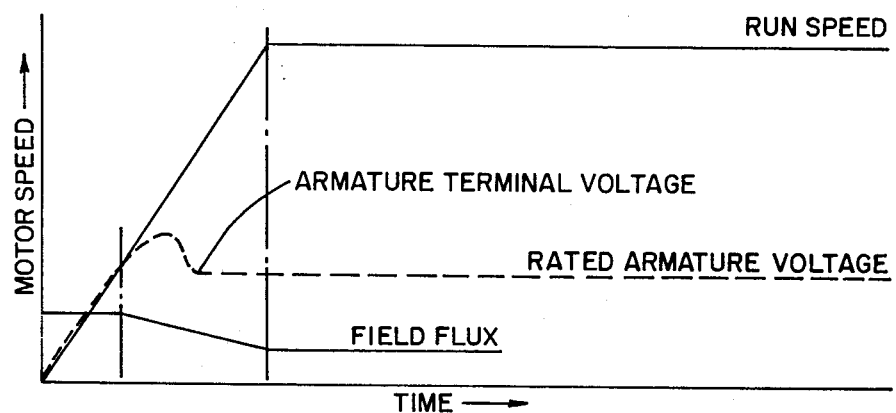
FIG. 3 is a curve illustrating the motor armature overvoltage condition resulting from a fast ramp change in the desired speed reference signal applied to the prior art speed control apparatus.

If the voltage reference +Vm* is held constant in accordance with the teachings of the prior art, at a value corresponding to rated motor voltage when the armature voltage control apparatus begins its regulation operation, transient voltage overshoot would overvoltage the motor armature with a typical uncontrolled armature voltage transient peak condition when the drive motor is accelerating on a fast ramp being illustrated by the curve shown in FIG. 3.

Figure 4:
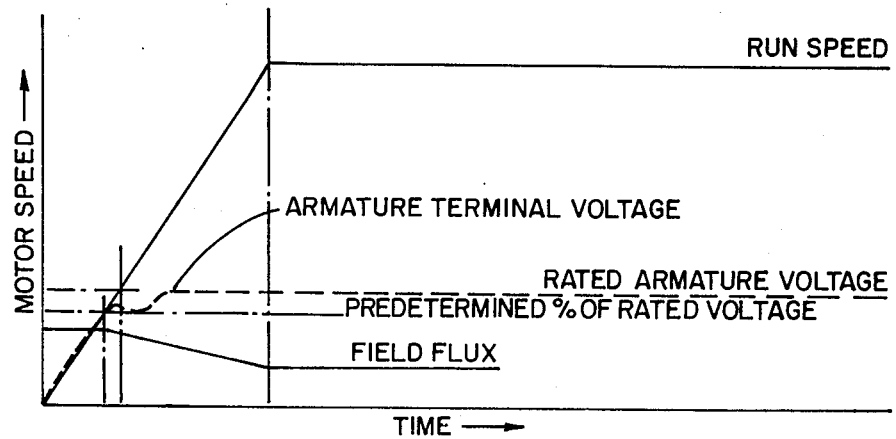
FIG. 4 is a curve illustrating the improved motor armature voltage operation obtained with the speed control apparatus of the present invention.
Figure 5A:
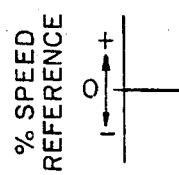
FIGS. 5A, 5B, 5C, 5D are a series of curves illustrating the improved speed control operation of the direct current motor by the present speed control apparatus.
Figure 5B:
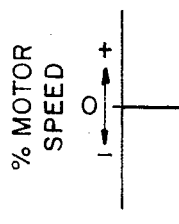
Figure 5C:
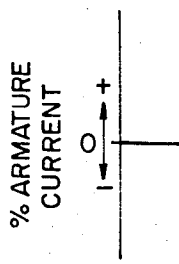
Figure 5D:
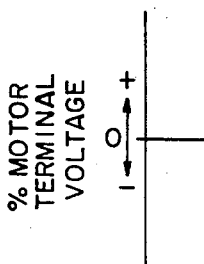

In relation to the curve shown in FIG. 4, the voltage reference +Vm* could be set at 75 percent of rated motor voltage such that when the actual motor terminal voltage −Vm gets to 75 percent of rated armature voltage, the voltage controller 34 would begin to override the field current controller 36 and start to regulate the field flux for motor armature voltage. A 25 percent actual armature voltage overshoot could reasonably occur, and the desired armature terminal voltage would not be exceeded, if the voltage controller 34 begins to regulate when the sensed motor voltage −Vm reaches for example a 75 percent value. The voltage reference signal +Vm* applied to the voltage controller 34 is increased as a function of motor speed until the motor speed is at rated base speed or higher, at which time the voltage reference +Vm* is clamped at motor rated terminal voltage. To give some time delay for the voltage controller 34 transients to die out the incremental increase in voltage reference Δ Vm as a result of increase in motor speed is delayed typically one-half second by the input of the voltage reference summer 70. If the drive motor 10 should stop increasing speed at an operative actual speed somewhere between 75 percent of base speed and 100 percent of base speed, the voltage reference +Vm* would correspond to that speed and the motor field flux would still be held at rated field flux. The following control relationships illustrate the transfer function for the voltage reference +Vm* as a function of motor speed.

1. Armature Voltage Ref. = 0.75 (rated Voltage); when Motor Speed < 0.75 Base Speed.
2. Armature Voltage Ref. = [0.75 + | P.U. Motor Speed −0.75 | × (1)/1+0.5S] (Rated Voltage) when 0.75 (Base Speed) < Motor Speed < Base Speed; S = Laplace Operator
3. Armature Voltage Ref. = Rated Voltage; when Motor Speed > Base Speed.

The curves shown in FIG. 5 illustrate the speed response operation of the motor field current controllers 34 and 36 shown in FIG. 1 in relation to an abrupt change in the speed reference signal. In FIG. 5A, there is shown a first change in the speed reference signal in a first direction followed by a return to a zero speed reference signal and a step decrease in the speed reference signal in the opposite direction. In FIG. 5B, there is shown the motor speed resulting from the operation of the motor field controllers 34 and 36 shown in FIG. 1 for each of the forward direction and reverse direction speed reference signals. In FIG. 5C, the curve illustrates the resulting armature current of the drive motor in response to the forward and reverse direction speed reference signals. And in FIG. 5D, there is shown the resulting motor armature terminal voltage resulting from the speed reference signal changes shown in FIG. 5A.

I claim:

1. In speed control apparatus for a direct current motor including an armature and a field winding, the combination of
   first means operative with said armature to determine the motor speed from zero to base speed by controlling the armature voltage,
   second means operative with said field winding for controlling the field flux of said motor to determine the motor speed above said base speed,
   third means operative with said field winding and responsive to said armature voltage for controlling the armature voltage of said motor, and
   means responsive to the armature voltage of the motor for selecting one of said field flux controlling second means and said armature voltage controlling third means to determine the speed of said motor.

2. The speed control apparatus of claim 1, with said means for selecting being operative in relation to a predetermined value of the rated armature voltage of said motor.

3. The speed control apparatus of claim 1, with said means for selecting being operative in relation to a predetermined value of the base speed of said motor.

4. The speed control apparatus of claim 1, with said means for selecting being operative to provide a field flux in accordance with at least one of a predetermined value of armature voltage and a predetermined value of motor speed.

5. The speed control apparatus of claim 1, including means responsive to the armature voltage of said motor and operative with said selecting means for determining the speed of said motor while preventing said armature voltage from going above the rated armature voltage of said motor.

6. The speed control apparatus of claim 1, with said means for selecting being operative to regulate said armature voltage without armature voltage overshoot above rated armature voltage when the motor speed is controlled to be above base speed of said motor.

7. The speed control apparatus of claim 1, with said means for selecting being operative to change the gain of at least one of said field flux controlling means and said armature voltage controlling means as a function of motor speed.

8. In speed control apparatus for a direct current motor having an armature and a field winding, the combination of
   first means operative with said armature for controlling the armature voltage of said motor to determine the motor speed from zero to base speed,
   second means for providing a control signal in response to the armature voltage of said motor,
   third means operative with said field winding for controlling the field current of said motor,
   fourth means operative with said field winding for controlling the armature voltage of said motor, and
   means for controlling the speed of said motor above said base speed in response to said control signal and operative with said field current controlling third means when said armature voltage is below a predetermined value and operative with said armature voltage controlling fourth means when said armature voltage is above said predetermined value.

9. The speed control apparatus fo claim 8, including means for providing a second control signal in response to the speed of said motor, and with said speed controlling means being responsive to said second control signal.

10. The speed control apparatus of claim 8, with said speed controlling means being operative in relation to field flux weakening of the motor.

11. The speed control apparatus of claim 8, with said predetermined value being a precentage of rated motor armature voltage.

12. In speed control apparatus for a direct current motor including an armature and a field winding through a speed range extending above base speed, the combination of first means operative with said armature for controlling the armature voltage to establish the motor speed below base speed, second means operative with said field winding and responsive to the field current for controlling the field flux of said motor to establish the speed of said motor above said base speed, third means operative with said field winding and responsive to said armature voltage to establish the speed of said motor above said base speed, and means responsive to the speed of said motor and operative with at least said field flux controlling second means for establishing said speed when the speed of said motor is above base speed.

13. The speed control apparatus of claim 12, with said field flux controlling second means including a field current controller and with said third means including a voltage controller.

14. The speed control apparatus of claim 12, with said speed responsive means being operative with each of said third means and with said field flux controlling second means.

15. The speed control apparatus of claim 12, with said field flux controlling second means being responsive to a predetermined value of said armature voltage for establishing said motor speed.

* * * * *